STRIP LINE CIRCULATORS HAVING SLITS IN THE BRANCH LINES

Filed Aug. 7, 1968 3 Sheets-Sheet 1

PRIOR ART

United States Patent Office 3,513,413

Patented May 19, 1970

3,513,413

STRIP LINE CIRCULATORS HAVING SLITS IN THE BRANCH LINES

Shojiro Nakahara and Nobutake Orime, Kamakura-shi, Japan, assignors to Mitsubishi Denki Kabushiki Kaisha, a corporation of Japan Filed Aug. 7, 1968, Ser. No. 750,905
Claims priority, application Japan, Aug. 11, 1967, 42/51,593
Int. Cl. H01p 1/32, 5/12
U.S. Cl. 333—1.1 2 Claims

ABSTRACT OF THE DISCLOSURE

In a strip line multiple branch line type circulator wherein a ferrimagnetic member is disposed between an inner conductor including branch lines and a junction and a ground conductor, and a DC magnetic field of an intensity sufficient to magnetize the ferrimagnetic member at a point below the magnetic resonance point is applied to the ferrimagnetic member, thus effecting broad band matching within the ferrimagnetic member to miniaturize the circulator. To this end slits are provided for branch lines at positions thereof between the joint and the periphery of the ferrimagnetic member.

This invention relates to a strip line multiple branch circulator wherein a ferrimagnetic member is interposed between an inner conductor comprising branch lines and a junction and a ground conductor, and the ferrimagnetic member is supplied with a DC magnetic field sufficient to magnetize it to a point below magnetic resonance characterized in that portions of the inner conductors which are narrower than the portions projecting out from the ferrimagnetic member are located at positions influenced by the Tensor permeability between said junction and a point within the periphery of the ferrimagnetic body. According to this invention a portion of the inner conductor in the ferrimagnetic member which is under the influence of the Tensor permeability is considered as a strip transmission line in which any higher mode other than the TEM mode (transverse electromagnetic mode) is not established whereby to effect a wide band matching in the ferrimagnetic member thus miniaturizing the circulator.

The invention can be more fully understood from the following description taken in conjunction with the accompanying drawing in which.

Figure 1:
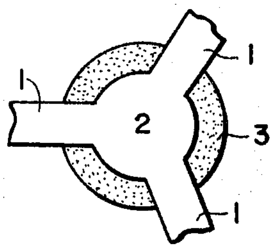
FIG. 1 is a plan view to show the junction of a prior art wide band strip line Y circulator.
Figure 3:
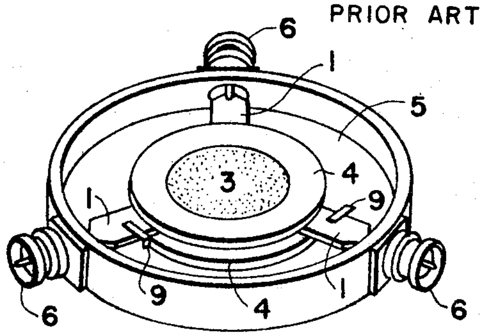
FIG. 3 PRIOR ART
FIG. 3 is a diagrammatic perspective view of a prior art wide band strip line Y circulator.
Figure 2:
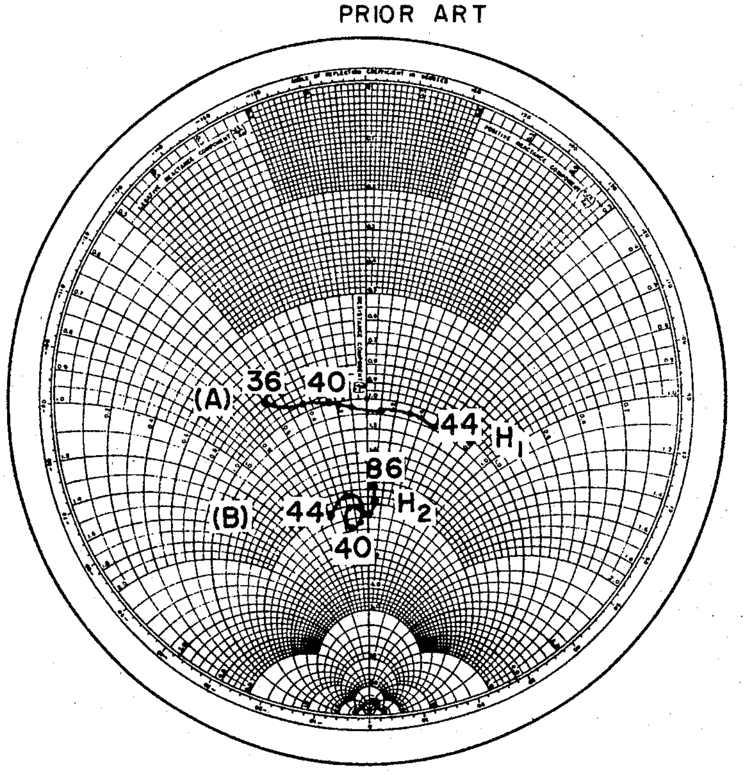
FIG. 2 PRIOR ART
FIG. 2 is a polar diagram to show the variation in the frequency characteristic of a prior art wide band strip line Y circulator due to change of applied magnetic field before matching.

FIG. 1 of the accompanying drawing shows a junction of inner conductors of a strip line Y circulator which has been used extensively and comprising branch lines 1 made of strip lines having wide width, a junction 2 interconnecting these branch lines and a ferrimagnetic member 3. Upon application of a magnetic field H, the strip line circulator of the construction described will have a narrow band width and manifests a frequency characteristic equivalent to a parallel resonance circuit as shown by curve A, FIG. 2. Upon further increase of the applied field the absolute value of admittance and the change of phase angle gradually decrease until finally a most excellent frequency characteristic is manifested before matching under a certain applied magnetic field as shown by curve B, FIG. 2. As shown in FIG. 3, in the prior art wide band width circulator, in order not to lose this frequency characteristic, a $\lambda/4$ transformer 4 made of a dielectric substance is provided around the ferrimagnetic member 3 to increase the impedance as viewed from the end surface of the ferrimagnetic member thus assuring matching over a very wide band. Reference character 5 designates a ground conductor, 6 a conductor and 9 a screw for adjusting the intrinsic value.

However, as such a prior circulator is provided with a $\lambda/4$ transformer, the dimensions of the circulator cannot be reduced beyond a certain limit. Moreover, as the characteristic of the dielectric substance is degraded by the rapid change in temperature, such circulator is not suitable for applications where temperature varies over a wide range.

It is therefore an object of the present invention to eliminate above described defects and to provide a circulator of excellent temperature characteristic and of small size.

Figure 4:
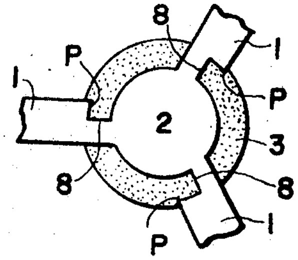
FIG. 4 is a plan view of the junction of a wide band strip line Y circulator embodying this invention.
Figure 6:
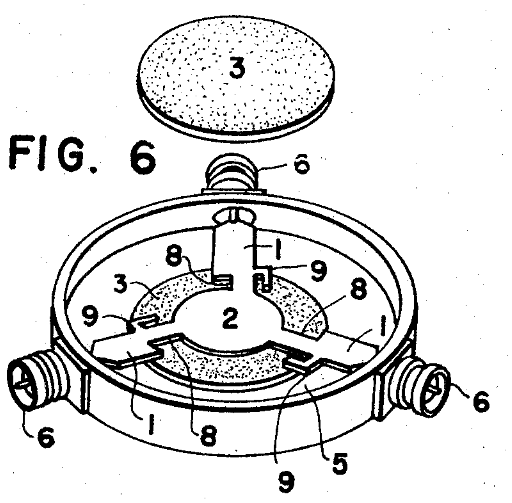
FIG. 6 is a diagrammatic perspective view of a wide band strip line Y circulator embodying this invention. Throughout the drawing the same or corresponding parts are designated by the same reference numerals.
Figure 5:
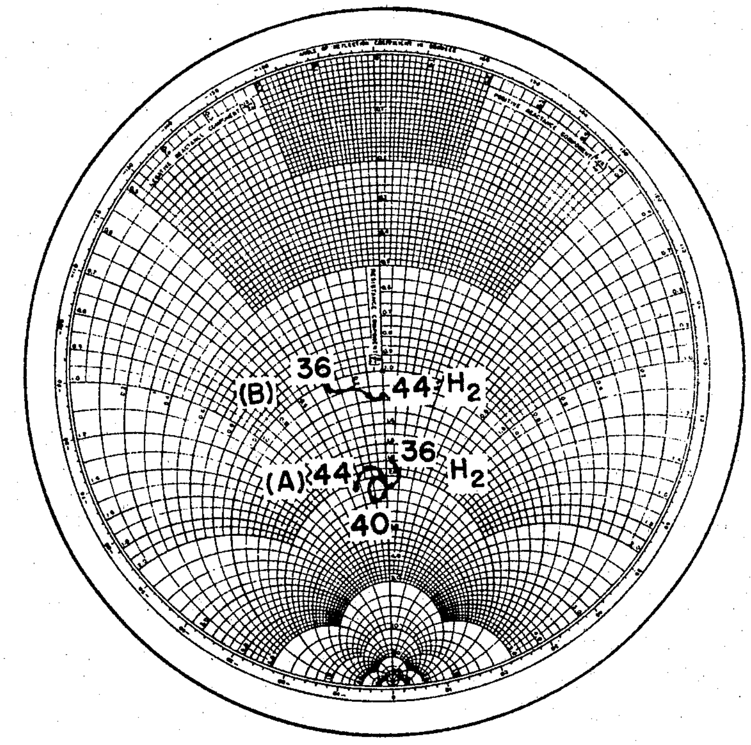
FIG. 5 is a polar diagram to show the effect of increasing impedance according to this invention.

FIG. 4 shows a junction for inner conductors of a circulator embodying this invention. Branch lines 1 are provided with narrow portions 8 which are influenced by the Tensor permeability in the ferrimagnetic member. The outer ends P of the narrow portions are positioned within the periphery of the ferrimagnetic member. With this construction, it is able to effectively increase the impedance as viewed from the end surface of the ferrimagnetic member thus broadening the bandwidth. FIG. 5 shows this result. Curve A shows a manner in which the impedance is reduced concurrently with the improvement of the frequency characteristic when the intensity of the applied magnetic field is gradually increased with reference to one end of the ferrimagnetic member in the conventional circulator, whereas curve B illustrates the manner of increasing the impedance according to this invention. FIG. 6 shows one embodiment of this invention comprising branch lines 1, narrow portions 8 provided for the branch lines at positions influenced by the Tensor permeability thereof and a capacitive conductor 9 for correcting the intrinsic value.

As can be clearly noted from the characteristic shown by curve B in FIG. 5 the novel circulator manifests excellent frequency characteristic near unity conductance and in a more or less inductive region. Thus matching of respective arms can be made by providing a capacitive line for correcting the intrinsic value at the end surface of the ferrimagnetic member thus providing a wide band circulator of the size about ¼ of that of the prior wide band circulator.

In a strip line circulator operating at a point below the tuning point, dependent upon the area of the circular central portion of the inner conductor in contact with the ferrimagnetic member, the operating magnetic field required to provide the same frequency characteristic usually changes.

It is necessary to suitably elect the operating magnetic field in order to broaden the bandwidth, such as to select $4\pi MS$ (saturating magnetization), in order to improve the temperature characteristic so that it is possible to vary the operating magnetic field according to $4\pi MS$ of the ferrimagnetic member by varying area of the narrow portion. Accordingly, it is possible to provide a miniature circulator having an excellent temperature characteristic as well as a wide bandwidth characteristic when it is operated at the normal temperature.

What is claimed is:

1. In a strip line multiple branch line circulator comprising a disc shaped joint, an inner conductor including at least three branch lines commonly coupled to and extending out from said joint, at least one disc shaped ferrimagnetic member having a larger diameter than that of said joint, a ground conductor locating said disc shaped ferrimagnetic member coaxially with respect to said disc shaped joint, said lines extending out from said member, and means to apply a DC magnetic field to said ferrimagnetic member to magnetize same at a point below magnetic resonance, the improvement wherein:

said inner conductor has portions at a position influenced by the Tensor permeability between said junction and a point within the periphery of said ferrimagnetic member which are narrower than the other portions of said branch lines which extend out from said ferrimagnetic member, said portions being asymmetrically located with respect to the longitudinal axis of their respective branch line.

2. The strip circulator according to claim 1 wherein each of said branch lines is provided with a compensating capacitive conductor.

References Cited

UNITED STATES PATENTS

| | | | |
|---|---|---|---|
| 3,277,399 | 10/1966 | Simon ______________ | 333—1.1 |
| 3,355,679 | 11/1967 | Carr ______________ | 333—1.1 |
| 3,377,570 | 4/1968 | Dean et al. _________ | 333—1.1 |

HERMAN KARL SAALBACH, Primary Examiner

P. L. GENSLER, Assistant Examiner

U.S. Cl. X.R.

333—84